Oct. 21, 1958     E. UMRATH     2,857,562
ELECTRICAL DAMPING NETWORK
Filed June 18, 1956
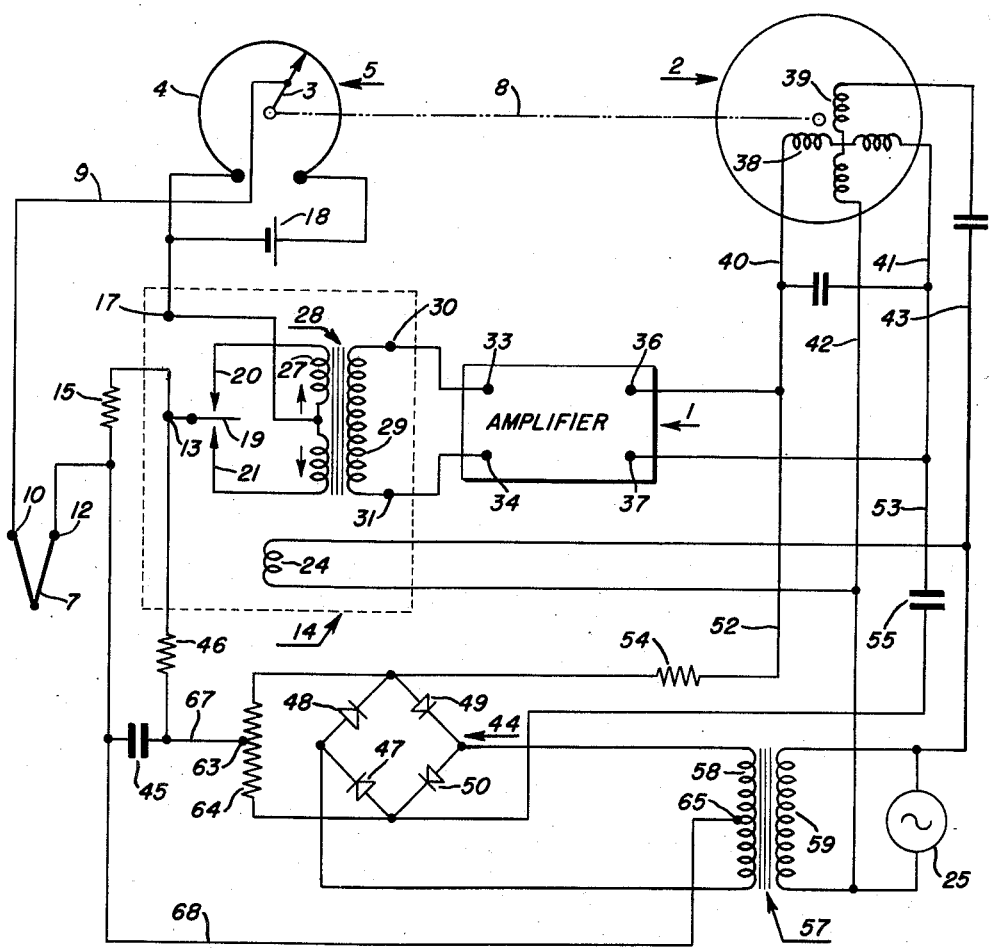
ERNST UMRATH
INVENTOR.
BY
Rudolph J. Junick
ATTORNEY United States Patent Office 2,857,562
Patented Oct. 21, 1958

2,857,562

ELECTRICAL DAMPING NETWORK

Ernst Umrath, North Plainfield, N. J., assignor, by mesne assignments, to Daystrom, Incorporated, Murray Hill, N. J., a corporation of New Jersey Application June 18, 1956, Serial No. 591,923

8 Claims. (Cl. 318—448)

This invention relates to automatic, self-balancing recorders and/or controllers of the potentiometric type and more particularly to a novel and effective arrangement for providing damping to prevent overshooting and/or hunting of the potentiometric balancing system.

Recorders and automatic control systems of the potentiometric class contemplated by this invention respond to mechanical, chemical, electrical or other physical changes of a condition in order to effect a record of the changes, or to maintain predetermined physical conditions at controlled points. The self-balancing arrangement includes a contact engaging a resistance wire included in a sensitive measuring circuit, such contact being automatically adjusted along the resistance wire to balance the E. M. F. of a thermocouple, or other potential being measured, or controlled, against the potential drop in a portion of the measuring circuit that includes more or less of the said resistance wire. Inasmuch as the sliding contact and the associated source of mechanical power, connecting mechanism, etc., includes some mass, a system of this type is likely to hunt about the balance point before a true static balance is obtained. Numerous proposals have been advanced to overcome such hunting without significantly affecting the speed of response of the apparatus to a change in the condition being measured or controlled. Such prior apparatus has often been costly and cumbersome.

An object of this invention is the provision of a simple arrangement for damping the movable mechanism of slide-wire potentiometers.

An object of this invention is the provision of a damping arrangement for slide-wire recorders and controllers which arrangement comprises means wherein the unbalance between the D.-C. E. M. F. being measured or controlled, and the D.-C. E. M. F. in a portion of a measuring circuit, is converted to an A.-C. signal which is fed to an amplifier, which amplifier operates a motor for actuating the slide wire whereby an E. M. F. balance is obtained, the said amplifier being provided with a negative feedback circuit which includes a polarized bridge network and a delaying RC network.

An object of this invention is the provision of a self-balancing instrument of the class comprising a potentiometer including a fixed resistor connected to a source of constant voltage and a slide engaging the resistor, the said slide and one end of the resistor constituting the output circuit of the potentiometer, a variable voltage source connected to the potentiometer output circuit in an opposing relation thereto, a chopper circuit wherein any voltage unbalance between the said variable voltage source and potentiometer output is converted to an A.-C. signal, an amplifier having as an input the said A.-C. signal, means responsive to the amplifier output to move the slider in one direction or the other to thereby establish a voltage balance between the said variable voltage source and the potentiometer output, a feedback circuit around the said chopper circuit and amplifier and including a polarized rectifier bridge network, the amplifier output circuit being connected to one set of opposed bridge junctions, a polarizing potential connected to the other set of opposed bridge junctions, the output of the said polarized rectifier bridge network being obtained from the mid-point of a center-tapped impedance connected across each set of opposed bridge junctions, and a delay network comprising a shunt capacitor and series resistor connected between the said rectifier bridge output and the input to the chopper circuit.

These and other objects and advantages will become apparent from the following description when taken with the accompanying drawing. It will be understood that the drawing is for purposes of illustration and is not to be construed as defining the scope or limits of the invention, reference being had for the latter purposes to the appended claims.

The single figure of the drawing is a diagrammatic representation of a self balancing potentiometric system employing my novel damping arrangement.

Referring to the drawing, there is illustrated in schematic form an arrangement including an electronic amplifier 1 and an electric reversible two phase motor 2 for actuating a movable contact 3 along a slidewire resistor 4 of a null-point potentiometric network designated generally by reference numeral 5. The arrangement shown may be used to measure and record the temperature of a furnace (not shown) in which a thermoelement 7 is positioned and is responsive to changes of temperature therein. The movable contact 3 of the potentiometer is adapted to be driven by the motor 2 through the mechanical connection 8 (which is illustrated as a broken line in the drawing) and which may include gearing, or any other suitable connecting means. For a high speed recorder system, a light weight pulley arrangement has been found to function well. An electrical conductor 9 connects the movable contact 3 with one terminal 10 of the thermoelement 7. The other terminal 12 of the thermoelement is connected to one input terminal 13 of a chopper circuit 14 through a series feedback resistor 15. The second input terminal 17 of the chopper circuit 14 is connected to one end of the slide-wire resistor 4, across which resistor is connected a source of constant current 18. It is apparent that the potential generated by the thermoelement 7 can be balanced by the potential drop across the slide-wire resistor 4 between the movable contact 3 and one end of the slide-wire resistor. When an unbalance occurs, the reversible motor 2 moves the movable contact 3 in the desired direction along the slide-wire resistor 4 so as to rebalance the potentiometer.

The chopper circuit 14 converts the potentiometric unbalance direct current into A. C. signal currents which are easily amplified. The chopper may be of any desired form and has been illustrated in the drawing as comprising an electro-magnetic switch having a movable contact 19 and a pair of stationary contacts 20 and 21. A coil 24 is connected to an A. C. reference voltage source 25, which may be an ordinary 60 cycle, 115 volt source. When the coil 24 is energized by the A. C. source of potential 25, the movable contact 19 is alternately attracted to and repelled from the coil and so electrical contact is alternately made between the movable contact 19 and the stationary contacts 20 and 21. Any unbalance voltage which appears at the chopper circuit input terminals 13 and 17 is applied alternately to the contact 21 which are connected to the ends of the center-tapped primary winding 27 of the transformer 28. It will be obvious that the D. C. unbalance potential will result in a current flow through one-half of the transformer primary winding 27 which is in the upward direction during one-half cycle of the reference potential, and a current flow in the other one-half of the transformer primary winding 27 which is in the downward direction during the other one-half cycle of the reference potential. Such current flow directions are shown by the arrows adjacent the transformer primary winding 27 for a situation where the input terminal 13 is positive and the input terminal 17 is negative. As a result of such primary winding currents, an A. C. signal appears at the transformer secondary winding 29 and thus at the chopper circuit output terminals 30, 31. It will be noted that because the coil 24 in the chopper circuit 14 is energized by the A. C. reference potential source 25, the output A. C. signal from the chopper circuit will either be in phase with the potential reference source 25 or displaced 180 degrees out of phase therewith, depending upon the polarity of the D. C. unbalance signal between the thermoelement 7 and the potentiometric network 5.

The chopper circuit output signal is fed to the input terminals 33, 34 of the A. C. amplifier 1. The amplifier 1 may comprise one (1) or more stages of amplification as required to produce the desired output power. Thus there appears at the output terminals of the amplifier an alternating current also having a predetermined phase relation with respect to that of the A. C. source of potential 25, and whose magnitude is dependent upon the potential applied to the amplifier input terminals up to the point that the amplifier saturates. Any signal at the amplifier input in excess of that which saturates the amplifier, obviously, will not be felt at the amplifier output. The amplified signal is taken from the amplifier output terminals 36, 37 and applied to the control winding 38 of the reversible, two phase, motor 2 by the electrical conductors 40, 41. The reference winding 39 of the motor 2 is connected to the A. C. reference potential source 25 through the lead wires 42, 43. Reaction between the field set up by the control winding 38 and that set up by the reference winding 39 causes the motor armature to rotate in one direction or the other depending upon the relative phase between the currents in the two windings. The direction and extent of the motor rotation is controlled by the direction and amount of unbalance of the potentiometer so that upon rotation of the motor, the movable contact 3 is adjusted in the proper direction to return the potentiometer to a balanced condition.

As those skilled in this art know, a pen may be mounted so as to move with the movable contact 3 and arranged to cooperate with a recording chart whereby a continuous record of temperature is provided. The chart may be driven by a motor, or any other suitable means, so that a time record of temperature is obtained.

To prevent overshooting of the slider as it moves to a new balance point I employ an amplifier feedback arrangement which comprises a rectifier bridge network 44, a feedback signal delay network which includes a capacitor 45 and resistor 46, and associated circuitry. The rectifier bridge network 44 consists of four rectifier elements 47, 48, 49 and 50 arranged in the same sense in a closed ring. The input signal to the rectifier bridge is obtained from the output terminals of the amplifier 1 which are connected to the bridge by electrical conductors 52, 53 through a limiting resistor 54 and a blocking capacitor 55.

The conjugate diagonal arm of the rectifier bridge network is connected to the secondary winding 58 of a transformer 57; the primary winding 59 of which is connected to the A. C. potential source 25. The transformer 57 provides the rectifier bridge network with a polarizing current of sufficient magnitude to reduce the resistance of alternate pairs of rectifier elements to substantially the lowest value. As will be understood by those skilled in this art, the resistance of one pair of rectifier elements is reduced on the positive one-half cycle of polarizing current while the resistance of the other pair of rectifier elements is reduced on the negative one-half cycle thereof. Because the same A. C. potential source energizes both the chopper circuit coil 24 and the transformer 57, it will be apparent that the polarizing current is of the same frequency as the amplifier output signal. For proper operation of the rectifier bridge network, the amplitude of the polarizing current should be substantially in excess of the input signal current from the amplifier output.

When an A.-C. signal is applied to the rectifier bridge network from the amplifier output circuit, the output from the rectifier bridge network is a pulsating D.-C. potential which is of one polarity when the polarizing current and the input signal to the bridge from the amplifier output are in phase and is of the other polarity if the polarizing current and input signal to the bridge are 180 degrees out of phase. The pulsating D.-C. rectifier bridge output potential is taken from the center-tap 63 of the resistor 64 and the center-tap 65 of the secondary winding 58 of the transformer 57; which resistor and secondary winding are connected across conjugate diagonal arms of the rectifier bridge network. Lead wires 67, 68 connect the resistor center-tap 63 and the transformer center-tap 65 to a delaying RC network which includes the capacitor 45 and resistor 46 which, in turn, are connected to the feedback resistor 15, which is in series with the chopper input circuit. The polarity of the D.-C. feedback signal at the feedback resistor 15 is opposite the polarity of the D.-C. unbalance signal and so a negative feedback results.

It will be noted, that if there is no potentiometric unbalance, and thus no D.-C. input to the chopper circuit 14, there will be no alternating current amplifier input or output signal and consequently no A.-C. input signal to the rectifier bridge network. The polarizing potential from the transformer secondary winding 58 will not of itself cause a rectifier bridge pulsating D.-C. network output, and so there is no feedback signal when there is no A.-C. signal from the amplifier. When a potentiometric unbalance occurs, however, so that there is an output from the amplifier 1, the magnitude of the feedback signal which is obtained from the rectifier bridge network is proportional to the signal from the amplifier 1 while the polarity of the feedback signal is a function of the phase relation between the polarizing potential from the transformer 57 and the amplifier output signal polarity. The negative feedback signal results, in effect, in a reduction of the original unbalanced signal by the amount of feedback potential.

The amplifier 1 has an extremely high gain and will saturate with only a very small signal. In effect, any potential unbalance large enough to produce visible motion on the slide wire contact 3 will saturate the amplifier. As has been mentioned above, the feedback signal will not be felt when the amplifier is saturated, therefore, the speed of response of the amplifier system to an instantaneous unbalance signal, for all practical purposes, is unaffected by the feedback network.

The amplifier feedback system and delaying RC network, for practical purposes, affects the signal to the motor 2 from the amplifier 1, only when the D.-C. input unbalance potential between the thermoelement 7 and potentiometric network 5 is decreasing toward zero. As soon as the A.-C. input signal at the amplifier is less than that necessary to saturate the amplifier 1, the feedback signal becomes effective to reduce the amplifier output signal and so reduce the speed at which the motor 2 rotates. When the D.-C. signal which results from a potentiometric unbalance decreases to the point where the feedback signal is larger than the potentiometric unbalance signal, motor braking action takes place. The amplifier input and output signals reverse polarity and the current which is fed to the motor consequently produces an opposite torque in the motor thus causing braking action. The inertia of the motor, and attached mechanical system, maintains the direction of motor rotation the same although a reverse torque is produced by the motor. The capacitor 45 continues to discharge until the thermoelement 7 voltage and potentiometric network 5 voltage balance. The RC time constant of the capacitor 45 and resistors 46 and 15 is chosen so as to be proportional to the braking requirement of the system which, in turn, depends primarily on the mass of the rotatable armature and other moving parts. The magnitude and duration of this braking action is adjusted such that oscillations, overshoot, and creep-in of the movable contact 3 at the point of balance is eliminated.

It is apparent then, that with my novel electrical damping network, braking of the motor takes place only when the potentiometeric unbalance is decreasing, that is, approaching zero. No braking occurs during the rise of a potentiometric unbalance and the system is substantially unaffected by the feedback system during the rise providing the unbalance potential results in an A.-C. signal which is great enough to saturate the amplifier over the feedback signal. Thus, by the proper choice of circuit components, rebalance of an unbalanced system takes place in the minimum of time with no hunting of the potentiometer.

Having now described my invention in detail in accordance with the patent statutes, various changes and modifications will suggest themselves to those skilled in this art, and it is intended that such changes and modifications shall fall within the spirit and scope of the invention as recited in the following claims.

I claim:

1. A self-balancing system for balancing variations in a first source of D.-C. E. M. F. comprising a second source of D.-C. E. M. F. to which the said first source of D.-C. E. M. F. is opposed, means varying the magnitude of the said second source of D.-C. E. M. F. to balance the potential of said first source, circuit means converting a D.-C. unbalance E. M. F. to an A.-C. E. M. F., an amplifier having as an input the said A.-C. E. M. F., means responsive to an output signal from the said amplifier and effecting a balance between the said opposed first and second sources of E. M. F., and an amplifier feedback system including a rectifier bridge network to provide a D.-C. feedback signal opposing the unbalance signal of the first and second sources, whereby the said converting means is provided with a negative feedback potential.

2. The invention as recited in claim 1 including an electrical delay network in the said amplifier feedback system whereby the said negative feedback potential is maintained until the said D.-C. unbalance E. M. F. substantially reaches zero.

3. The invention as recited in claim 1 wherein the said amplifier feedback system comprises rectifier elements arranged in the same sense in the respective side arms thereof, a source of reference voltage, a transformer having a primary winding for connection to the source of reference voltage and a secondary winding for connection to one set of opposed junctions of the said bridge, the output signal from the said amplifier being connected to the other set of opposed junctions of the said bridge, and a center-tapped impedance connected across each set of opposed bridge junctions whereby the said negative feedback potential is obtained from between the center-taps of the said impedances.

4. The invention as recited in claim 3 including a resistor and capacitor in the said amplifier feedback system which form an RC delay network whereby the said negative feedback potential is maintained until the said capacitor is discharged.

5. In a self-balancing instrument of the class comprising a potentiometer including a fixed resistor connected to a source of constant D.-C. voltage and a slide engaging the resistor, the said slide and one end of the resistor constituting the output circuit of the potentiometer, a variable D.-C. voltage source connected to the potentiometer output circuit in an opposing relation thereto, circuit means the input of which is the voltage unbalance between the said variable D.-C. voltage source and potentiometer D.-C. output voltage and the output therefrom is a converted A.-C. signal, an amplifier having as an input the said A.-C. signal, means responsive to the amplifier output to move the slide in one direction or the other to thereby establish a voltage balance between the said variable voltage source and the potentiometer output; and an amplifier feedback circuit opposing said voltage unbalance whereby the said circuit means is provided with a negative feedback.

6. The invention as recited in claim 5 including an electrical delay network in the said amplifier feedback circuit whereby the said negative feedback is maintained until the said voltage unbalance between the said variable D.-C. voltage source and the potentiometric D.-C. output voltage is substantially eliminated.

7. The invention as recited in claim 5 wherein the said amplifier feedback circuit includes a rectifier bridge network comprising rectifier elements arranged in the same sense in the respective side arms thereof, a polarizing voltage connected to one set of opposed junctions of the said bridge, the amplifier output being connected to the other set of opposed junctions of the said bridge, and a center-tapped impedance connected across each set of opposed bridge junctions, the center-taps of the said impedances being connected to the input of the said circuit means.

8. The invention as recited in claim 7 including an electrical delay network in the said amplifier feedback circuit comprising a resistor and capacitor.

References Cited in the file of this patent

UNITED STATES PATENTS

| | | |
|---|---|---|
| 2,692,358 | Wild | Oct. 19, 1954 |
| 2,692,359 | Ehret | Oct. 19, 1954 |
| 2,764,719 | Woodson | Sept. 25, 1956 |